D. W. SWEAT.
PLOW BEAM ATTACHMENT.
APPLICATION FILED FEB. 21, 1914.
1,211,894.
Patented Jan. 9, 1917.
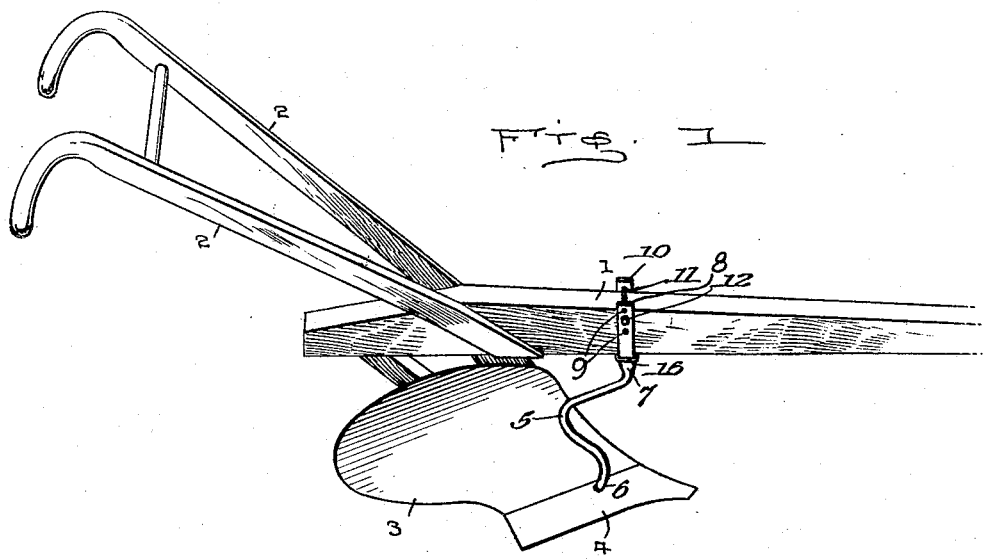
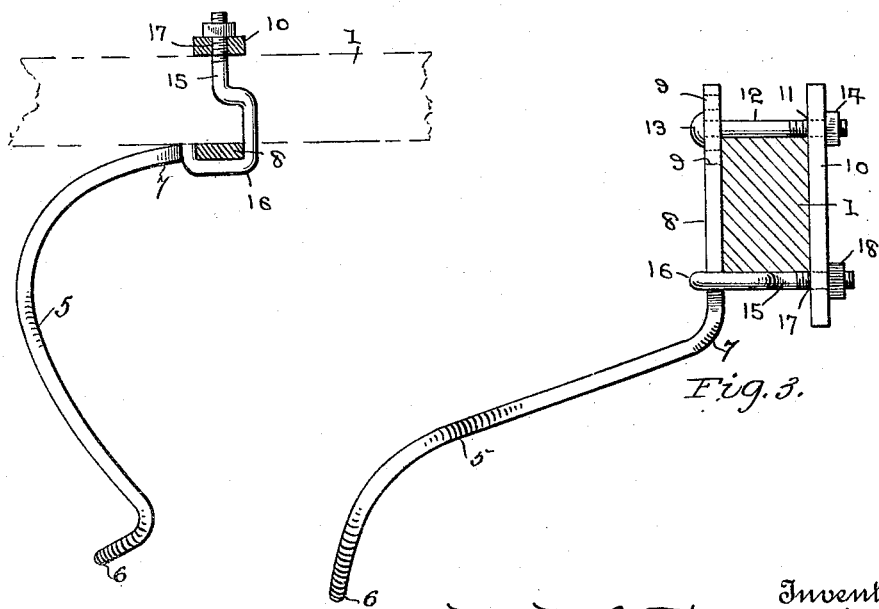
Witnesses
Inventor
D. W. Sweat
By
Attorney
THE NORRIS PETERS CO., PHOTO-LITHO., WASHINGTON, D. C.

UNITED STATES PATENT OFFICE.

DAVID WALTER SWEAT, OF WAYCROSS, GEORGIA.

PLOW-BEAM ATTACHMENT.

1,211,894. Specification of Letters Patent. Patented Jan. 9, 1917.

Application filed February 21, 1914. Serial No. 820,207.

*To all whom it may concern:*

Be it known that I, the undersigned, DAVID WALTER SWEAT, a citizen of the United States, residing at Waycross, in the county of Ware and State of Georgia, have invented certain new and useful Improvements in Plow-Beam Attachments; and I do hereby declare the following to be a full, clear, and exact description of the invention, such as will enable others skilled in the art to which it appertains to make and use the same.

This invention relates to an attachment for the beam of a plow and is more particularly designed for use in connection therewith for efficiently dragging the weeds, stubble or green crops sown for the purpose of enriching the soil, and has for one of its objects the provision of a laterally extended curvilinear weed hook for bending over the stubble or green crops in advance of the mold-board of the plow in order that the same may be turned under in the furrow by the plow.

Another object of this invention resides in the provision of an attachment for a plow whereby the same may be adjusted along the beam thereof in a longitudinal direction for adjusting the same relatively to the height of the stubble or green crops to be turned under for preventing the exposure of the same above the plowed ground.

A further object of this invention resides in the provision of an attachment for plows for turning under green crops, etc., whereby the attachment is capable of vertical adjustment for regulating the same in accordance with the depth of plowing.

These and other objects will more fully appear and the nature of the invention will be more clearly understood by the construction, combination and arrangement of the parts thereof as described in the following specification, defined in the appended claims and illustrated in the accompanying drawings, in which, Figure 1 is a side view of a plow showing my attachment arranged thereon in operative position. Fig. 2 is a top detail view partly in section, the beam being shown in dotted lines, showing the means by which the attachment is secured at the under side of the beam of the plow through the means of the hook end bolt. Fig. 3 is a front view of my device, the beam being shown in section illustrating the position of the laterally extending arm of the attachment and the complete means of securing the same to the beam of the plow.

For the sake of convenience and illustration of the adaptation of my invention to a plow I have shown the plow in conventional form wherein 1 denotes the beam, 2 the handles, 3 the mold-board and 4 the share thereof. At any desired point upon the beam 1 at the mold-board side thereof is the laterally downward and slightly rearwardly extending curvilinear weed hook 5 of reversely curved formation provided at the free end thereof with the rearwardly curved end 6, the curved end being designed to provide a guard finger for deflecting the weed hook from objects which the same may come in contact therewith such as stones, trees, etc., and also to retain the growth within the body portion of the weed hook. The inner end of the weed hook 5 is bent upwardly to provide the curved neck 7 approximately right angularly thereto and continuing from the neck 7 is the vertically extending attaching shank or bar 8, the bar 8 being provided with a series of alined apertures 9 adjacent the upper end thereof and provides means for the vertical adjustment of the weed hook 5 upon the beam 1. Vertically disposed upon the beam 1 at the side opposite to the attaching bar 8 is the retaining bar 10 provided adjacent the upper end thereof with the aperture 11 and through which aperture and one of the apertures 9 of the attaching bar 8 is designed to pass the bolt 12, the head 13 of the bolt bearing against the outside of the bar 8 and the nut 14 of the bolt 12 positioned at the outer side of the retaining bar 10, the bolt 12 positioned upon the upper surface of the beam 1 and designed to connect the upper ends of the attaching bar 8 and the retaining bar 10.

For additionally securing the attachment to the beam 1 I provide the hook end bolt 15 at the under side of the beam, the hook end 16 of the bolt 15 embracing that portion of the attaching bar 8 adjacent the angular bent portion or neck 7 of the weed hook 5, the threaded end of the bolt 15 extending through the aperture 17 arranged adjacent the lower end of the retaining bar 10, and upon the projecting screwthreaded end of the bolt 15 is the nut 18, the bolt 15 and nut 18 providing means for securing the lower portions of the attaching bar 8 to the retaining bar 10 at the under side of the beam 1 of the plow.

By the provision of the hook end bolt the hook 16 embraces that portion of the attaching bar 8 where the greatest stress is exerted, thus the hook 16 provides the most efficient means of securing the attaching bar 8 at the under side of the beam 1 whereby the strength of the weed hook is not weakened at the point of greatest stress as the same would be with apertures formed through the bar at this point.

I desire to state that my attachment consists of an integral structure and may be formed of any suitable material and either rounded or rectangular in cross section as desired, however, I have here illustrated the weed hook 5 as being rounded this being the preferred form from the fact that there are no sharp edges for engaging the stubble or green crops to be turned under and thereby adding to the draft of the plow, whereby the same being rounded in cross section glides easily over the upper surfaces of the bent crops, etc., with little or no friction and by curving the body of the hook rearwardly the edges of the foliage upon the ground are deflected inwardly toward the center line of the hook and thereby facilitates the more efficient covering of the foliage by the mold board of the plow. And, further, in the construction of my attachment for plows I have invented a device which may be attached to any plow now in use and by the adjustment of the same longitudinally of the beam, as well as vertically thereon provides a device for efficiently regulating the same to meet all the requirements and conditions attending the use and purposes of which my invention is designed.

While I have here shown the preferred embodiment of my invention I hereby reserve the right to make such alterations and variations therein from time to time as I may deem expedient and which will not depart from the spirit of this invention or the scope of the appended claims.

Having thus fully described my invention, what I claim and desire to secure by Letters-Patent is:

1. In a weed hook attachment for plows, comprising an integral bar, consisting of a reversely curved body portion terminating in a rearwardly turned guard finger at one end, and a vertical shank at its other end, and means for securing said shank upon the beam of a plow.

2. In a weed hook attachment for plows, comprising an integral bar, consisting of a vertically disposed attaching shank having a plurality of apertures in its upper end, a downwardly and rearwardly curved neck extending from the lower end of said shank, a reversely curved body portion extending laterally downward from said neck, a rearwardly turned guard finger upon the free end of said body portion, and means for adjustably attaching said neck hook upon a plow beam.

3. In a weed hook attachment for plows, comprising an integral bar, consisting of a vertically disposed attaching shank having a plurality of apertures in its upper end, a downwardly and rearwardly curved neck extending from the lower end of said shank, a laterally and slightly downwardly disposed body portion extending from said neck, said body portion being curved first rearwardly and downwardly and thence forwardly and downwardly and having its free end curved rearwardly to provide a guard finger, and means for adjustably securing said weed hook upon a plow beam.

4. In a weed hook attachment for plow beams, comprising a downwardly obliquely disposed reversely curved hook member, having a rearwardly turned guard finger formed at its outer end, and an upstanding shank formed at its inner end, said shank having a plurality of apertures adjacent its upper end and adapted to engage one side of said beam, an apertured plate adapted to engage the opposite side of said beam, an upper securing bolt projecting through one of the apertures of said shank and the upper aperture of said plate, a lower securing bolt having a screw threaded end projecting through the lower aperture of said plate, and an angularly formed hook member at the opposite end of said lower bolt for embracing the lower portion of said shank, whereby to adjustably secure said weed hook upon said plow beam.

In testimony whereof I have signed my name to this specification in the presence of two subscribing witnesses.

DAVID WALTER SWEAT.

Witnesses:
A. W. BRADY,
M. L. STUDLEY.

Copies of this patent may be obtained for five cents each, by addressing the "Commissioner of Patents, Washington, D. C."